US008423463B1

(12) United States Patent
Matthews et al.

(10) Patent No.: US 8,423,463 B1
(45) Date of Patent: Apr. 16, 2013

(54) PERSONAL FINANCIAL MANAGER WITH GIFT CARDS AGGREGATION

(75) Inventors: Lindsay Gordon Matthews, Sudbury, MA (US); Christopher Lang Mocko, Palo Alto, CA (US); Derrick Ruyoung Chao, San Francisco, CA (US); Albert Joongkyu Ko, Palo Alto, CA (US); Mark Robert Shulman, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 320 days.

(21) Appl. No.: 12/731,106

(22) Filed: Mar. 24, 2010

(51) Int. Cl.
*G06Q 40/00* (2006.01)
(52) U.S. Cl.
USPC .................. 705/41; 705/35; 705/40
(58) Field of Classification Search ...................... 705/41
See application file for complete search history.

(56) References Cited

U.S. PATENT DOCUMENTS

| 7,895,096 | B1 * | 2/2011 | Vu et al. ........................... 705/30 |
| 2005/0222951 | A1 * | 10/2005 | Sherman .......................... 705/40 |
| 2010/0280911 | A1 * | 11/2010 | Roberts et al. ................... 705/21 |

* cited by examiner

*Primary Examiner* — Lindsay M Maguire
*Assistant Examiner* — Cho Kwong
(74) *Attorney, Agent, or Firm* — Osha Liang LLP (57) ABSTRACT

A method for managing the use of a gift card with a personal financial management application (PFMA), including storing a balance of the gift card in the PFMA, obtaining, using a central processor (CPU) of a computer and within the PFMA, a transaction of a user, identifying, using the CPU, the gift card as a payment source of the transaction, and adjusting, using the CPU and in response to identifying the gift card as the payment source, the balance in the PFMA based on the transaction.

30 Claims, 5 Drawing Sheets

PERSONAL FINANCIAL MANAGER WITH GIFT CARDS AGGREGATION

BACKGROUND

A gift card is a restricted monetary equivalent that is issued by merchants or banks to be used as an alternative to a non-monetary gift. A gift card may resemble a credit card in size and is typically identified by a specific number or code (i.e., gift card ID) without an individual's name, thus could be used by anybody in possession of the gift card.

Typically, the gift cards are backed by an on-line electronic system for authorization. In such case, the balance of a gift card is not stored on the gift card itself, but is instead recorded in the issuer's database and cross referenced to the gift card ID (e.g., a number listed on the gift card). In other cases, some gift cards may be a stored value card with the balance stored on the gift card itself. Some gift cards can be reloaded and used for multiple times. In most cases, the gift cards may have a barcode or magnetic strip, which is read by an electronic reader. Many gift cards have no value until they are sold, at which time the cashier enters the amount (i.e., the initial balance) which the customer wishes to put on the gift card. Other gift cards may have a set value and need to be activated by calling a specific phone number.

Some gift cards are issued by a merchant and are only redeemable at the stores (or vendor stores) operated by the issuer. Other gift cards are issued by a third party issuer (e.g., banks, credit card companies, or other entities such as a retail mall) and can be redeemed at a larger number of locations, such as certain business types, certain localities, or participating retailers (or vendors). Bank-issued gift cards may also be used as a rebate card in lieu of checks as a way to disburse rebate funds from a merchant. Some rebate cards can be used anywhere major credit cards are accepted. In this document, the terms "merchant", "store", "retail store", "retailer", and "vendor" may be used interchangeably depending on the context and refer to a physical business entity, information related to the physical entity, or other forms of infrastructures associated with the business entity.

Gift cards are extremely popular, yet consumers often fail to manage what gift cards they have, what amounts are left on the gift cards, where the cards can be used, and when the gift cards will expire. In addition, consumers often receive gift cards to stores they don't frequent and therefore end up never using the gift cards.

SUMMARY

In general, in one aspect, the invention relates to a method for managing the use of a gift card with a personal financial management application (PFMA). The method includes storing a balance of the gift card in the PFMA, obtaining, using a central processor (CPU) of a computer and within the PFMA, a transaction of a user, identifying, using the CPU, the gift card as a payment source of the transaction, and adjusting, using the CPU and in response to identifying the gift card as the payment source, the balance in the PFMA based on the transaction.

In general, in one aspect, the invention relates to a computer readable medium storing instructions executable by a computer to perform method steps to manage the use of a gift card. The instructions include functionality for: storing a balance of the gift card in a personal financial management application (PFMA), obtaining, within the PFMA, a transaction of a user, identifying the gift card as a payment source of the transaction, and adjusting the balance in the PFMA based on the transaction in response to identifying the gift card as the payment source.

In general, in one aspect, the invention relates to a system for managing the use of a gift card. The system includes a personal financial management application (PFMA) executing on a central processing unit (CPU) and configured to track spending data of a user and maintain a balance of the gift card and a gift card management module operatively coupled to the PFMA configured to obtain information of the gift card from the user, access a computer system of an issuer of the gift card based on the information of the gift card, obtain the balance of the gift card from the computer system of the issuer of the gift card, and provide the balance to the PFMA.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing gift cards and aggregating them into personal financial management application (PFMA) software for a user. For example, the gift card may be held by a user of the PFMA who is also a consumer making a purchase using the gift card. In this context, the user of the PFMA is also the user of the gift card. Throughout this document, the term "user" may refer to the user of the PFMA as well as the user of the gift card depending on the context. As noted above, the gift card may be used for making a purchase at a store operated by an issuer (e.g., a merchant) of the gift card or at a store that participates in a gift card program operated by the issuer of the gift card (e.g., a bank or other financial institution). In addition to allowing the user to manage common financial data, the PFMA configured with the gift card aggregation capability allows the user to aggregate (i.e., add) and track the values of all their gift cards.

In one or more embodiments of the invention, the gift card aggregation capability is provided by a gift card management module that allows the user to aggregate all their gift cards in one central location. In one or more embodiments, the gift card management module prompts the users to enter information about their gift card (e.g., issuer, participating merchant, balance, expiration, gift card ID, etc.). In one or more embodiments, the gift card management module automatically retrieves a balance of a gift card from a computer system of the gift card issuer based on the access information provide by the user.

Figure 1:
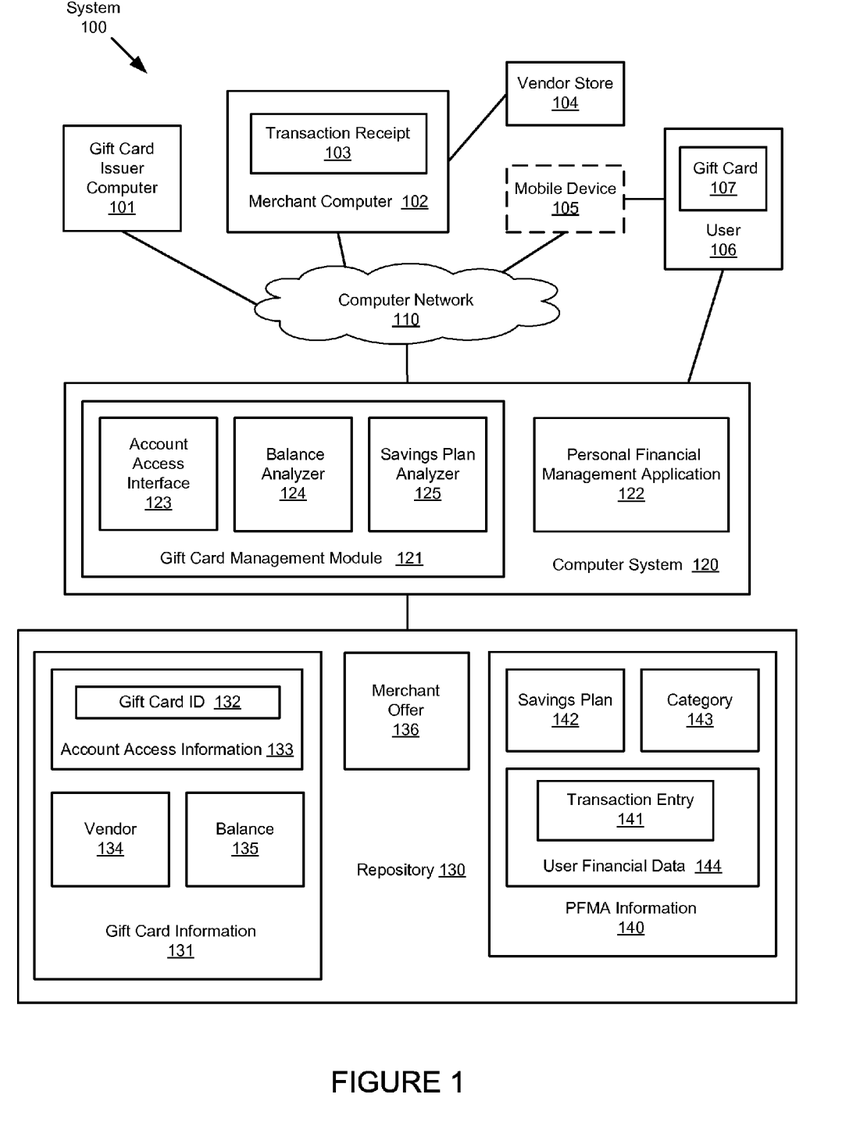
FIG. 1 depicts a schematic block diagram of a system in accordance with one or more embodiments of the invention.

FIG. 1 depicts a schematic block diagram of a system (100) in accordance with one or more embodiments of the invention. In one or more embodiments of the invention, one or more of the modules shown in FIG. 1 may be omitted, repeated, and/or substituted. Accordingly, embodiments of the invention should not be considered limited to the specific arrangements of modules shown in FIG. 1.

As shown in FIG. 1, the system (100) includes user (106) having gift card (107), computer system (120) installed with personal financial management application (PFMA) (122) and gift card management module (121), and repository (130) storing gift card information (131) of the gift card (107), merchant offer (136) from merchant computer (102), and PFMA information (140) of the PFMA (122).

Further as shown in FIG. 1, the gift card management module (121) includes account access interface (123), balance analyzer (124), and savings plan analyzer (125), the gift card information (131) includes account access information (133) having gift card ID (132), vendor (134), and balance (135), and the PFMA information includes savings plan (142), category (143), and user financial data (144) having transaction entry (141).

In addition, the computer system (120) is coupled to gift card issuer computer (101) and merchant computer (102) via a computer network (110) while the merchant computer (102) is shown as associated with the vendor store (104) and including transaction receipt (103).

Although only one of each of the vendor (134), category (143), transaction entry (141), and transaction receipt (103) is shown in FIG. 1, those skilled in the art will recognize that more than one of each of these components may be included in the system (100).

Optionally, the user (106) may have a mobile device (105) coupled to the computer network (110). In one or more embodiments of the invention, the mobile device (105) may be a smart phone, gaming console, mobile computer, or other networked devices with computing capabilities.

In one or more embodiments of the invention, the PFMA (122) is configured to track spending of the user (106) based on multiple categories (e.g., category (143)). For example, the user spending may be represented as the user financial data (144) and includes a particular purchase categorized within the PFMA (122) as associated with the category (143) and stored in the repository (130) as the transaction entry (141) of the user financial data (144). Specifically, the particular purchase may be made by the user (106) at the vendor store (104) operated by the merchant computer (102) of a corresponding merchant (not shown). Accordingly, the merchant computer (102) may store a record of the particular purchase in the form of the transaction receipt (103).

From time to time, the user (106) may use the gift card (107) to make purchases, for example at the vendor store (104) that accepts the gift card (107). In one or more embodiments, the issuer of the gift card (107) is a third party (e.g., bank, shopping mall, etc.) separate from the merchant operating the merchant computer (102) and the vendor store (104). In such embodiments, the vendor store (104) is referred to a participating vendor or a qualifying vendor with respect to the gift card (107). In one or more embodiments, the gift card (107) is issued by the merchant operating the vendor store (104). In such embodiments, the merchant computer (102) may be the same as the gift card issuer computer (101).

In one or more embodiments of the invention, the gift card issuer computer (101) is operated by an issuer of the gift card (107) and configured to host an on-line electronic system for authorizing and processing gift card purchases (e.g., made using the gift card (107)). For example, a purchase using the gift card (107) may be authorized at the vendor store (104) and associated with the transaction receipt (103). In one or more embodiments, the gift card issuer computer (101) is further configured to provide, based on a pre-determined authentication requirement, account information of the gift card (107) such as the balance (135) of the gift card (107) and information regarding participating vendors of the gift card (107), which may be stored in the repository as the vendor (134).

In one or more embodiments of the invention, the PFMA (122) is further configured to track, in cooperation with the gift card management module (121), gift card information (e.g., gift card information (131)) of one or more gift cards (e.g., gift card (107)) of the user (106). In one or more embodiments, the gift card management module (121) includes the account access interface (123), the balance analyzer (124), and the savings plan analyzer (125).

In one or more embodiments of the invention, the account access interface (123) is configured to access the gift card issuer computer (101) based on the account access information (133) (e.g., universal resource locator (URL), login credential such as user name and password, gift card ID (132), etc.) to obtain the balance (135) of the gift card (107) and/or the participating vendor (134) (e.g., in the case of a third party issuer issuing the gift card (107)) for providing to the PFMA (122). In one or more embodiments, the account access information (133) is provided by the user (106) to the account access interface (123).

In one or more embodiments of the invention, instead of automatically obtaining the balance (135) of the gift card (107) via the account access interface (123), the balance (135) of the gift card (107) is tracked using the balance analyzer (124) within the PFMA (122) by tracking individual transactions. For example, an initial value of the balance (135) may be entered by the user (106) into the balance analyzer (124), which in turn stores the initial value of the balance (135) in the repository (130).

In one or more embodiments, the purchase (e.g., associated with the transaction receipt (103)) is entered as a cash transaction by the user (106) into the balance analyzer (124), which in turn creates the transaction entry (141) in the PFMA (122). Either concurrently with the manual user input of the purchase or subsequent to the transaction entry (141) being created, the user (106) may designate or otherwise identify the gift card (107) as a payment source of the transaction entry (141). In one or more embodiments, the balance analyzer (124) is further configured to adjust the balance (135) based on the transaction entry (141) in response to the gift card (107) being identified as the payment source.

In one or more embodiments, the purchase (e.g., associated with the transaction receipt (103)) is entered via an electronic receipt ((e.g., the transaction receipt (103) may be an electronic receipt) into the balance analyzer (124), which in turn creates the transaction entry (141). In one or more embodiments, the electronic receipt (e.g., the transaction receipt (103)) may be sent to the user (106) and received using the mobile device (105) or the computer system (120). In one or more embodiments, the electronic receipt may be in the format of an email, text message, or other suitable forms. In one or more embodiments, the mobile device (105) is configured to receive the electronic receipt (e.g., the transaction receipt (103)) directly at a point of sales (POS) register. In one or more embodiments, the electronic receipt (e.g., the transaction receipt (103)) includes information identifying the gift card (107) as the payment source of the purchase. For example, the electronic receipt (e.g., the transaction receipt (103)) may include a portion (e.g., last four digits) of the gift card ID (132)). In one or more embodiments, the balance analyzer (124) is further configured to identify the gift card (107) as the payment source of the transaction entry (141) based on the electronic receipt (e.g., the transaction receipt (103)). For example, the balance analyzer (124) may compare the last four digits of the gift card ID (132) extracted from the electronic receipt (e.g., the transaction receipt (103)) to the gift card ID (132) previously registered with the PFMA (122) and stored in the repository (130). In one or more embodiments, the balance analyzer (124) adjusts the balance (135) based on the transaction entry (141) in response to the gift card (107) being identified as the payment source.

In one or more embodiments of the invention, the PFMA (122) is further configured to track user spending reduction in an effort to achieve a target savings amount. For example, the target savings amount may be related to planning for a future purchase of a target item for which the spending reduction savings is designated. In one or more embodiments, the user spending reduction is targeted and tracked in one or more spending categories (e.g., category (143)) within the PFMA (122). In one or more embodiments, the savings plan (142) includes the target savings amount, the one or more target categories (e.g., category (143)), a target savings schedule, and the target item for purchase.

In one or more embodiments of the invention, the savings plan analyzer (125) is configured to obtain information (e.g., URL) of a merchant accepting the gift card (107). For example, the merchant and the associated information may be identified by the savings plan analyzer (125) from the participating vendor information (e.g., vendor (134)) in the gift card information (131).

In one or more embodiments, the savings plan analyzer (125) is further configured to send, based on the information of the merchant, an inquiry (e.g., regarding price, availability, etc.) to a computer system (e.g., merchant computer (102)) of the merchant regarding the target item of the savings plan (142).

In one or more embodiments, the savings plan analyzer (125) is further configured to receive, in response to the inquiry, an offer (e.g., the merchant offer (136)) from the computer system (e.g., merchant computer (102)) of the merchant regarding the target item of the savings plan (142). For example, the merchant offer (136) may include price, availability, sales promotion (e.g., discount) and/or other relevant information regarding the target item of the savings plan (142).

In one or more embodiments, the savings plan analyzer (125) is further configured to adjust the target savings amount of the savings plan (142) based on the merchant offer (136) and the balance (135) to generate an adjusted target savings amount for the savings plan (142). For example, the target savings amount of the savings plan (142) may be reduced by the amount of the balance (135) and/or a difference between the offered price and the original estimated price based on which the savings plan (142) was initially formulated.

In one or more embodiments, the savings plan analyzer (125) is further configured to generate a notification to the user (106) related to the adjusted target savings amount. For example, the notification may include an estimated time to save the adjusted target savings amount determined by adjusting the original target savings schedule based on the merchant offer (136) and the balance (135).

In one or more embodiments, the savings plan analyzer (125) is further configured to receive, from the computer system (e.g., merchant computer (102)) of the merchant, low cost alternatives associated with the one or more spending categories targeted for spending reduction in the savings plan (142). For example, the savings plan analyzer (125) may communicate such targeted spending categories to the merchant computer (102), which in turn offers low cost alternatives in a targeted marketing/promotion program.

In one or more embodiments, the savings plan analyzer (125) is further configured to present the low cost alternatives to the user (106) to provide assistance to the user (106) in achieving the goal of the savings plan (142).

In one or more embodiments, the PFMA (122) is further configured to trade the gift card (107) with other consumers by transmit information (e.g., the issuer, the balance (135), the gift card ID (132), etc.) of the gift card (107) for soliciting interested trading parties. For example, the information (or a portion thereof) of the gift card (107) may be posted for sale or exchange on various electronic commerce sites of the Internet. Once traded, the other party of the trading becomes another user of the gift card (107).

Although the PFMA (122) and the gift card management module (121) are shown to be separate components in the computer system (120), those skilled in the art will recognize that the PFMA (122) and the gift card management module (121) may be configured in many different configurations. In one or more embodiments of the invention, the PFMA (122) and the gift card management module (121) are separate software applications communicating to each other based on a pre-determined interface. In one or more embodiments, the gift card management module (121) is a user installable plug-in module to the PFMA (122). In one or more embodiments, the gift card management module (121) is an optional module that is pre-configured within the PFMA (122). In one or more embodiments, the gift card management module (121) is built-in module within the PFMA (122).

In addition, although the PFMA (122) and the gift card management module (121) are shown to be included in one computer system (120), those skilled in the art will recognize that multiple computers may be used and the PFMA (122) and the gift card management module (121) may be distributed across multiple computers in a variety of combinations. For example, the computer system (120) may include a desktop computer (not shown) of the user (106) and a server computer (not shown) operated by an application service provider providing online personal financial management service functionalities.

Furthermore, although the computer system (120), the gift card issuer computer (101), the merchant computer (102), and the mobile device (105) are shown to be coupled via a computer network (110), those skilled in the art will recognize that multiple networks, point-to-point connections, or other suitable wired and wireless coupling configurations may also be used. For example, the Internet and a mobile phone data service network may be included in the computer network (110).

Figure 2A:
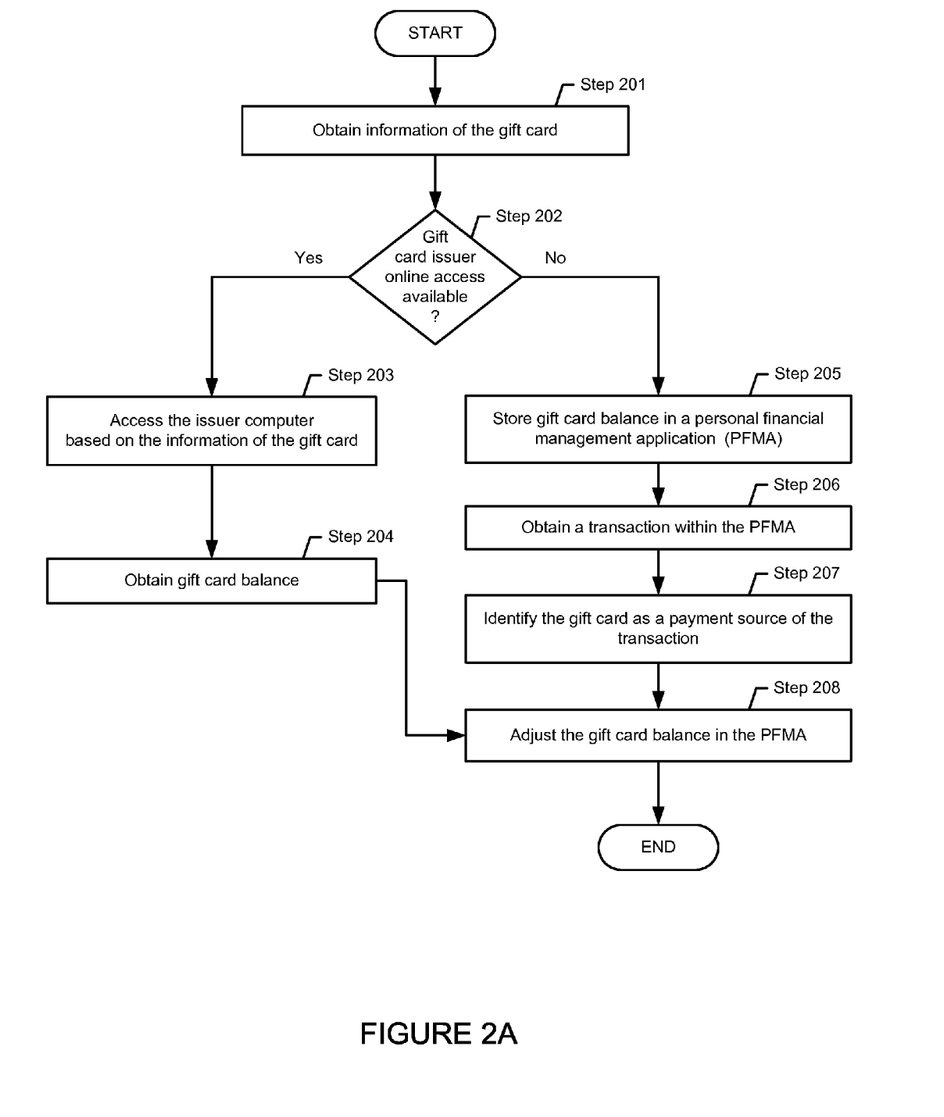
FIGS. 2A and 2B depict flowcharts of a method in accordance with one or more embodiments of the invention.
Figure 2B:
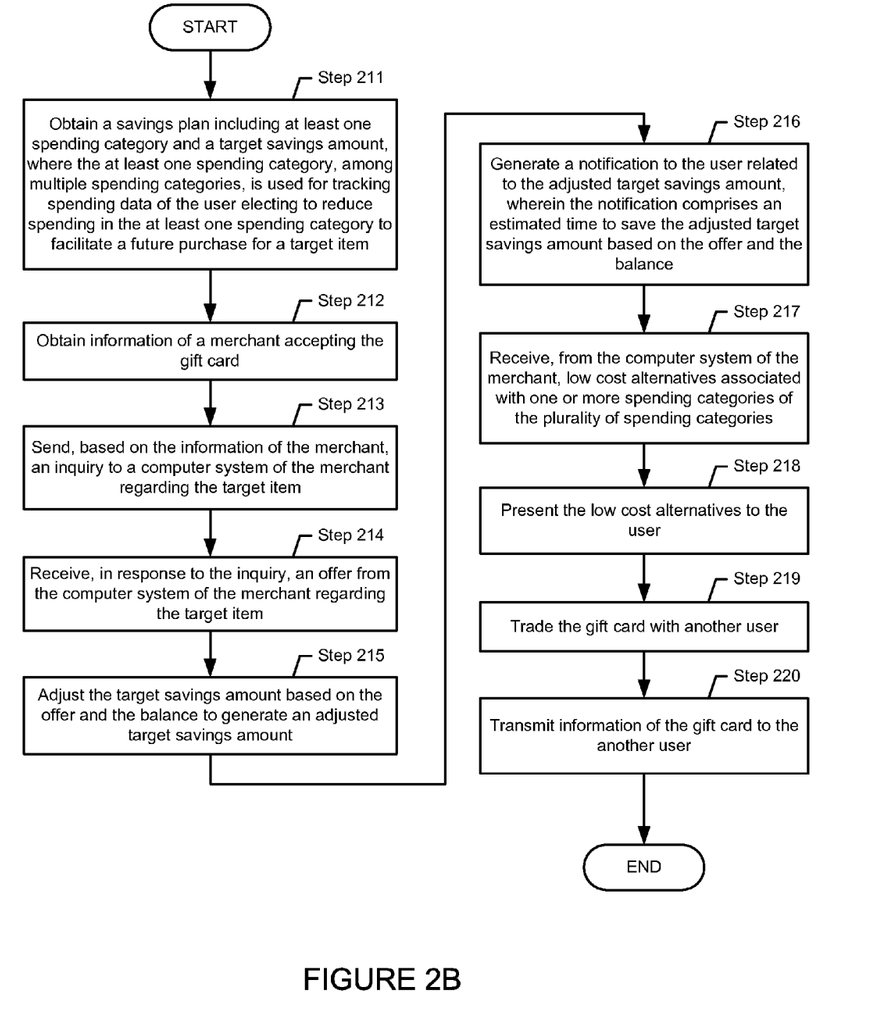

FIGS. 2A and 2B depict flowcharts of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B.

The method as shown in FIGS. 2A and 2B may be practiced using system (100) described with respect to FIG. 1 above. For example, a user of a personal financial management application (PFMA) may aggregate all his/her gift cards within the PFMA to track the gift card values in a complete financial picture of the user. Further, the gift cards tracking functionalities may be integrated with savings plan functionalities of the PFMA for the user to consider applying the gift cards toward savings plan goals. Furthermore, the gift cards tracking functionalities may be integrated with functionalities to interact with online merchants to provide the user with targeted sales/discount offers based on savings plan goals set up by the user within the PFMA.

In one or more embodiments of the invention, initial information of the gift card (i.e., issuing merchant/bank, starting balance, etc.) is provide (e.g., entered into the system (100)) by the user. Generally speaking, there are two ways of tracking the gift card's balance going forward. In one or more embodiments, the balance information is updated by accessing the gift card issuer's online website using, for example screen scraping techniques. In one or more embodiments, user transactions (i.e., purchases) using a gift card are entered into the PFMA with the payment source designated as the corresponding gift card. Accordingly, the balance of the gift card is updated by deducting the amounts of the user transactions.

As shown in FIG. 2A, initially in Step 201, information of a gift card is obtained from a user. In one or more embodiments of the invention, the information includes a name and/or a number of the gift card, which are used as gift card ID to identify the gift card. In one or more embodiments of the invention, the issuer of the gift card allows online access to the issuer computer for the user to retrieve updated gift card balance. In such embodiments, the information of the gift card may also include the online account access information such as universal resource locator (URL) and login credentials (e.g., user name and password) to access the issuer computer, for example via account web pages hosted on the issuer computer.

In Step 202, a determination is made as to whether online access to the gift card issuer computer is available. For example, the determination may be made by attempting to access the issuer computer based on the account access information provided by the user. If the online access is available (i.e., the attempt is successful), the method proceeds to Step 203 where the issuer computer is accessed for retrieving information. In one or more embodiments of the invention, the issuer computer is accessed from within the PFMA. Accordingly, a balance of the gift card is obtained automatically (Step 204). Typically, the balance obtained from the online account of the issuer computer is updated with purchase transactions made using the gift card. In one or more embodiments, the balance obtained in such manner is stored in the PFMA and/or the gift card balance is adjusted (Step 208).

Returning to Step 202, if online access to the gift card issuer computer is not available, the method proceeds to Step 205 where a starting (or initial) balance of the gift card is stored in the PFMA. In one or more embodiments of the invention, the starting gift card balance is provided by the user. For example, the user may specify the starting balance as part of the gift card information provide by the user in Step 201 above.

In Step 206, a transaction of the user is obtained within the PFMA. In one or more embodiments of the invention, the transaction may be a purchase made by the user that is tracked within the PFMA. For example, the purchase may be made using the gift card. In Step 207, the gift card is identified as the payment source of the transaction.

In one or more embodiments, the transaction is entered into the PFMA by the user as a cash transaction of which the gift card is designated as the payment source via user input. For example, the user may designate the payment source at the time when the transaction is entered. In other examples, the user may designate the payment source some time later subsequent to entering the transaction.

In one or more embodiments, the transaction is entered into the PFMA based on an electronic receipt issued by the merchant of the transaction. In one or more embodiments, the electronic receipt is sent to the user and processed by the PFMA automatically to create the corresponding transaction in the PFMA.

In one or more embodiments, the electronic receipt is sent to a front end portion of the PFMA on a mobile device of the user while the corresponding transaction is created on another portion of the PFMA on a computer/server in response to the PFMA front end receiving the electronic receipt.

In one or more embodiments, the electronic receipt is sent as an email, text message, or other suitable format. In one or more embodiments, the electronic receipt is sent to the user's mobile device configured with functionalities to interact directly with the point of sales (POS) register in receiving the electronic receipt.

In one or more embodiments, the electronic receipt includes information indicating the gift card as the payment source of the transaction. For example, the information may include a reference (e.g., a portion of the gift card ID such as the last four digits of the gift card number) to the gift card. Accordingly, the gift card may be automatically designated, within the PFMA, as the payment source of the transaction based on the electronic receipt.

In Step 208, the balance of the gift card is adjusted based on the transaction in response to identifying the gift card as the payment source. For example, the amount of the transaction may be deducted from the balance of the gift card to generate an updated balance.

As noted above, the gift cards tracking functionalities may be integrated with savings plan functionalities of the PFMA as well as functionalities to interact with online merchants. As shown in FIG. 2B, initially in Step 211, a savings plan is obtained. For example, the savings plan may be specified by the user within the PFMA, which uses spending categories to track spending data of the user. Specifically, the spending data of the user are categorized based on these spending categories. In particular, when specifying the savings plan, the user elects to reduce spending in one or more of these spending categories to facilitate a future purchase for a target item. In one or more embodiments of the invention, the savings plan includes the one or more spending categories targeted for spending reduction and a target savings amount to support the future purchase of the target item.

In Step 212, information of a merchant (i.e., participating vendor) accepting the gift card is obtained. In one or more embodiments of the invention, the information of participating vendors is provided by the user (e.g., in Step 201 of FIG. 2A) as part of the gift card information. In one or more embodiments, the information of participating vendors is retrieved from the issuer computer automatically based on online access functionalities (e.g., in Step 203 of FIG. 2A).

In Step 213, based on the information of the merchant, an inquiry regarding the target item of the savings plan is sent to a merchant computer. In one or more embodiments of the invention, the inquiry is related to price, availability, or other relevant information offered by the merchant with respect to the target item.

In Step 214, in response to the inquiry, an offer is received from the merchant computer regarding the target item. In one or more embodiments, the offer includes the aforementioned price, availability, or other relevant information offered by the merchant with respect to the target item.

In Step 215, the target savings amount of the savings plan is adjusted based on the offer from the merchant and the balance of the gift card to generate an adjusted target savings amount. In one or more embodiments of the invention, the target savings amount is reduced by a portion of the balance of the gift card that the user elects to apply toward the future purchase of the target item if the offer confirms, with a price, that the target item is available from the merchant. Accordingly, the time required to reach the goal of the savings plan may be reduced because the target savings amount is reduced to the adjusted target savings amount with the contribution from the gift card.

In Step 216, a notification is generated to the user related to the adjusted target savings amount. In one or more embodiments of the invention, the notification includes an estimated time to save the adjusted target savings amount based on the offer from the merchant and the portion of the balance to be applied toward the future purchase of the target item.

From time to time, the merchant may leverage the information contained in the inquiry, described in Step 213 above, to conduct targeted marketing activities. In one or more embodiments of the invention, the offer from the merchant includes a sales promotion (e.g., discounted price) associated with the target item. For example, the discounted price may be lower than the price on which the initial target savings amount was determined when formulating the savings plan. Accordingly, the estimated time to save the adjusted target savings amount may be further reduced based on the price discount.

In one or more embodiments of the invention, the inquiry, described in Step 213 above, includes requests to quote for additional items (i.e., merchandise) in the spending categories targeted for the spending reduction. In Step 217, low cost alternatives associated with the one or more spending categories targeted for spending reduction are among the merchant offer received, within the PFMA, from the merchant computer. Accordingly, these low cost alternatives are presented to the user as savings opportunities to contribute to the savings goal by further reducing the estimated time to save the adjusted target savings amount (Step 218).

With the gift card information tracked within the PFMA, the gift card may be traded electronically. In Step 219, the gift card is traded with another user based on functionalities configured in the PFMA. In one or more embodiments of the invention, the information (or a portion thereof) of the gift card is transmitted to solicit interest from other users. For example, the offer to trade the gift card may be posted on electronic commerce web sites. Specifically, the information of the gift card may be listed in the posting including information of the issuer of the gift card, the balance of the gift card, and an abbreviated gift card code (e.g., a number listed on the gift card).

Figure 3:
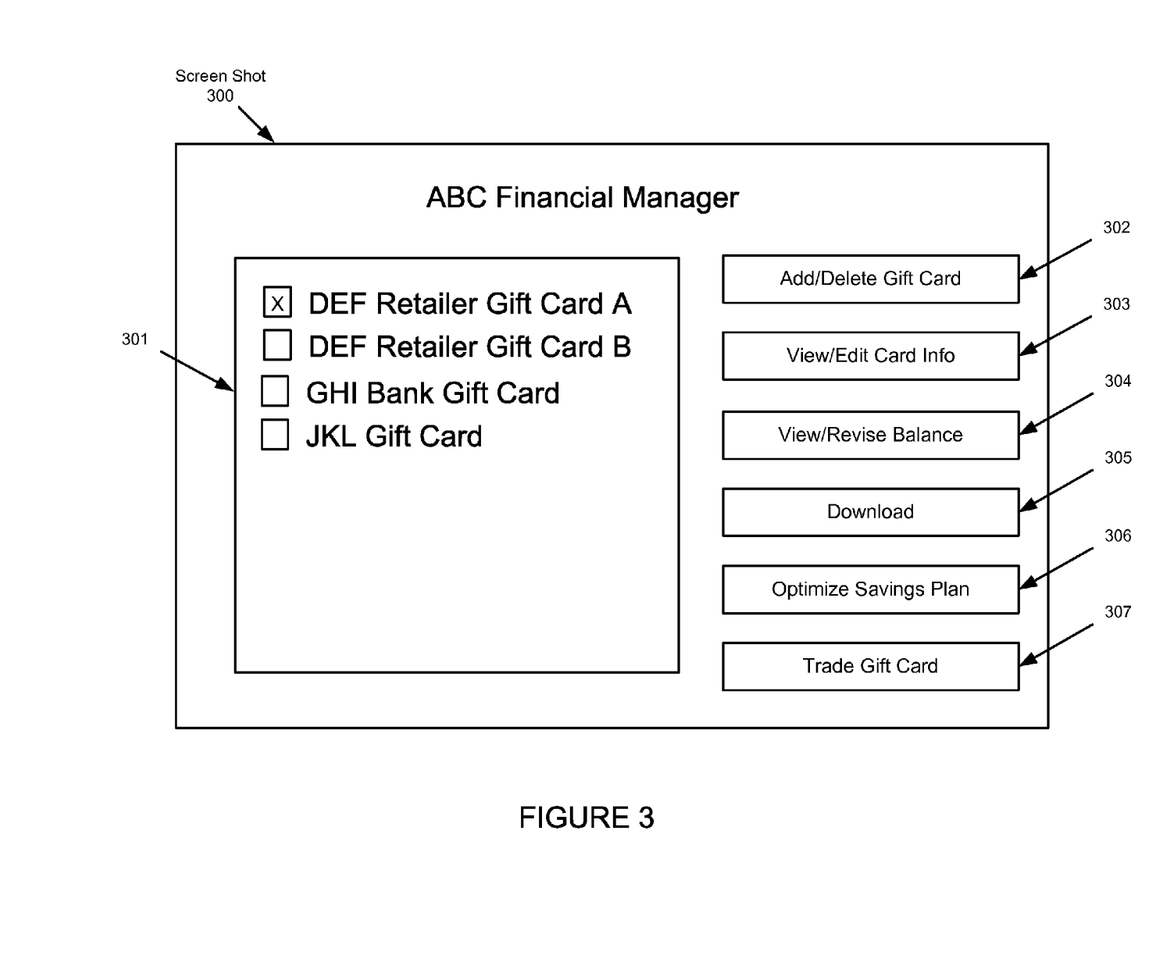
FIG. 3 depicts a screen shot of an application example in accordance with one or more embodiments of the invention.

FIG. 3 depicts an example in accordance with one or more embodiments of the invention. This example may be practiced using the system (100) of FIG. 1 and based on the method shown and described with respect to FIGS. 2A and 2B above. Therefore, the components and method steps of FIGS. 1, 2A, and 2B are referenced, but are not specifically shown in FIG. 3 for clarity. The user for the purposes of the example shown in FIG. 3 may be an individual, "Mary," who uses a personal financial management application called "ABC Financial Manager." In the example, ABC Financial Manager is a personal financial management software package that includes a gift card management module and a savings plan module. Further, in this example, the computer system is Mary's computer workstation, which is connected to the Internet.

FIG. 3A shows a screen shot (300), which illustrates an embodiment of the gift card management module (121) of FIG. 1. As shown, the screen shot (300) includes a gift card list window (301) and action buttons (302)-(307). In one or more embodiments of the invention, the gift card management module (121) is a collection of machine readable instructions and the screen shot (300) is a human readable interface of the gift card management module (121). In one or more embodiments of the invention, the screen shot (300) may be used by the user (106) to control the gift card management module (121) and to access the gift card information (131) depicted in FIG. 1.

In the example depicted in FIG. 3, the ABC Financial Manager allows Mary to aggregate all her gift card accounts. For example, the interface depicted in the screen shot (300) allows Mary to enter and track all her gift cards. Within the interface depicted in the screen shot (300), the gift card list (301) includes four gift cards entered into the ABC Financial Manager. The gift cards in the gift card list (301) are associated with individual selection boxes that allow each gift card to be selected for a particular action, for example activated using one of the action buttons (302)-(307).

As shown in FIG. 3, the action button (302) allows Mary to add or delete her gift cards in the ABC Financial Manager as reflected by the displayed list of gift cards in the display window (301). For example, Mary has entered two gift cards (A and B) issued by DEF Retailer, a gift card issued by GHI Bank, and a rebate card issued by service provider JKL.

The action button (303) allows Mary to view or edit information of each selected gift card. For example, the information may include gift card issuer, gift card ID, gift card issuer URL, gift card account access credential, etc.

The action button (304) allows Mary to view and edit the balance of a selected gift card. For example, the balance of the selected DEF Retailer Gift Card A may be viewed by Mary using the action button (303). In addition, the action button (303) may activate another window of the ABC Financial Manager that displays a list of transactions (e.g., within a selected period) allowing Mary to mark those transactions completed using the selected DEF Retailer Gift Card A. Based on such marked transactions, the balance of the selected DEF Retailer Gift Card A is revised accordingly within the ABC Financial Manager.

Some of the gift card issuers offer online account information access functionalities. The action button (305) allows Mary to download updated gift card balance of the selected DEF Retailer Gift Card A directly from the DEF Retailer's web site. For example, the download may use screen-scraping techniques to maintain accurate gift card balances within the ABC Financial Manager.

Further, the ABC Financial Manager allows Mary to set savings goals while the gift card feature of the ABC Financial Manager further allows Mary to associate the selected gift card with a specific savings goal. For example, Mary is saving to buy a $300 radio and she just received a $100 gift card to DEF Retailer. The action button (306) allows Mary to link the selected DEF Retailer Gift Card A to the savings goal for the radio. Accordingly, the ABC Financial Manager revises the savings goal for the radio from $300 to $200 considering the available balance of the DEF Retailer Gift Card A. From time to time, the ABC Financial Manager revises the savings goal as the balance of the DEF Retailer Gift Card A may be revised within the ABC Financial Manager, for example via the action buttons (304) and/or (305).

Furthermore, the gift card feature of the ABC Financial Manager synchronizes with online merchants to provide Mary with updated sales and discount offers. For example, the ABC Financial Manager may send inquiries to DEF Retailer regarding price and availability of the radio that Mary specified in the savings plan. The inquiries may also set up an alert condition for receiving notifications of upcoming sales promotions from DEF Retailer regarding the radio. These offers may also be especially targeted if the ABC Financial Manager synchronizes with DEF Retailer with respect to Mary's savings goals. For example, DEF Retailer may provide information regarding low price items in the particular spending categories targeted for spending reduction in Mary's savings plan.

Finally, the action button (307) allows Mary to trade her gift cards. For example, Mary may decide that she no longer shops at DEF Retailer and uses this action button (307) to automatically transmit the information of the DEF Retailer Gift Card A to other consumers that may be interested in the gift card for sale or exchange. For example, the action button (307) may embed the information of the DEF Retailer Gift Card A in a pre-formatted email for Mary to send to an interested party. Portions of the information (e.g., gift card ID) may be hidden until the trade is finalized. In another example, the action button (307) may access a trading web site and embed the information of the DEF Retailer Gift Card A in a pre-formatted sales/exchange listing for Mary to post on the web site. Again, portions of the information (e.g., gift card ID) may be hidden until the trade is finalized.

Figure 4:
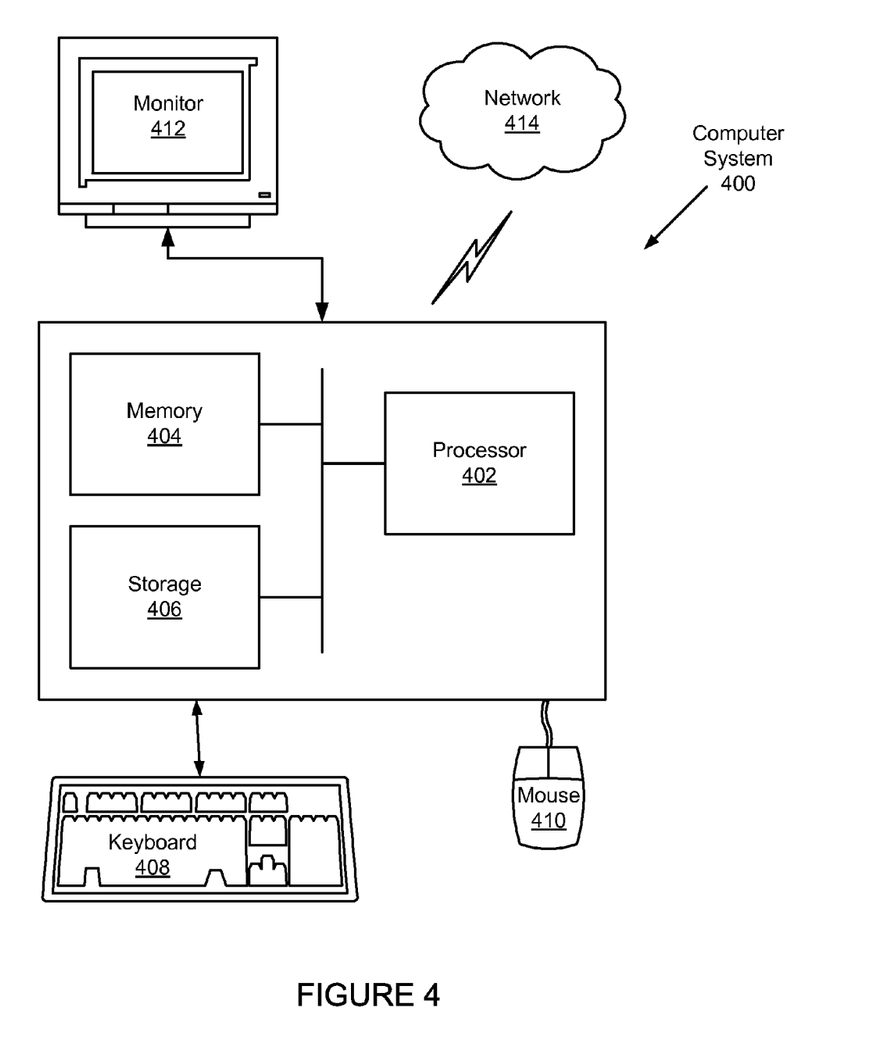
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402) (such as a central processing unit (CPU), integrated circuit, or other tangible hardware processing components), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., profiling module, matching module, association module, logic module, repository, etc.) may be located on a different node within the distributed system. In one embodiment of the invention, the node corresponds to a computer system. Alternatively, the node may correspond to a processor or CPU with associated physical memory. The node may alternatively correspond to a processor or CPU with shared memory and/or resources. Further, software instructions for performing embodiments of the invention may be stored on a computer readable medium such as a compact disc (CD), a diskette, a tape, a file, or any other tangible, non-transitory computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing the use of a gift card with a personal financial management application (PFMA), comprising:
    storing a balance of the gift card in the PFMA;
    obtaining, using a central processor (CPU) of a computer and within the PFMA, a transaction of a user;
    identifying, using the CPU, the gift card as a payment source of the transaction;
    adjusting, using the CPU and in response to identifying the gift card as the payment source, the balance in the PFMA based on the transaction;
    obtaining, within the PFMA, a savings plan comprising a target savings amount designated for a future purchase for a target item;
    generating, using the CPU, an adjusted target savings amount by:
        obtaining information of a merchant accepting the gift card,
        sending, based on the information of the merchant, an inquiry to a computer system of the merchant regarding the target item,
        receiving, in response to the inquiry, an offer from the computer system of the merchant regarding the target item, wherein the offer comprises a price discount,
        receiving an election from the user to apply a portion of the balance toward the future purchase, and
        reducing the target savings amount by the price discount and the portion of the balance; and
    generating, using the CPU, a notification to the user indicating an estimated time to save the adjusted target savings amount.

2. The method of claim 1, further comprising:
    obtaining information of the gift card from the user;
    accessing a computer system of an issuer of the gift card based on the information of the gift card; and
    obtaining the balance from the computer system of the issuer of the gift card.

3. The method of claim 1, wherein the transaction is input into the PFMA by the user.

4. The method of claim 1, wherein identifying the gift card as the payment source comprises receiving, within the PFMA, an input from the user designating the gift card as the payment source.

5. The method of claim 1, wherein the transaction is input into the PFMA based on an electronic receipt.

6. The method of claim 5,
    wherein the electronic receipt comprises a reference to the gift card, and
    wherein identifying the gift card as the payment source is based on the electronic receipt.

7. The method of claim 1,
    wherein the savings plan further comprises at least one spending category, wherein the at least one spending category, among a plurality of spending categories, is used for tracking spending data of the user, wherein the user elects to reduce spending in the at least one spending category to facilitate the future purchase for a target item.

8. The method of claim 7, wherein the offer comprises a sales promotion associated with the target item.

9. The method of claim 7, further comprising:
receiving, from the computer system of the merchant, low cost alternatives associated with one or more spending categories of the plurality of spending categories; and
presenting the low cost alternatives to the user.

10. The method of claim 1, further comprising:
trading the gift card with another user; and
transmitting, using the CPU, information of the gift card to the another user,
wherein the information of the gift card comprises information of an issuer of the gift card, the balance of the gift card, and a gift card code of the gift card.

11. A computer readable medium, embodying instructions executable by a computer to perform method steps to manage the use of a gift card, the instructions comprising functionality for:
storing a balance of the gift card in a personal financial management application (PFMA);
obtaining, within the PFMA, a transaction of a user;
identifying the gift card as a payment source of the transaction;
adjusting the balance in the PFMA based on the transaction in response to identifying the gift card as the payment source;
obtaining, within the PFMA, a savings plan comprising a target savings amount designated for a future purchase for a target item;
generating an adjusted target savings amount by:
obtaining information of a merchant accepting the gift card;
sending, based on the information of the merchant, an inquiry to a computer system of the merchant regarding the target item;
receiving, in response to the inquiry, an offer from the computer system of the merchant regarding the target item, wherein the offer comprises a price discount;
receiving an election from the user to apply a portion of the balance toward the future purchase; and
reducing the target savings amount by the price discount and the portion of the balance; and
generating a notification to the user indicating an estimated time to save the adjusted target savings amount.

12. The computer readable medium of claim 11, the instructions when executed by the computer further comprises functionality for:
obtaining information of the gift card from the user;
accessing a computer system of an issuer of the gift card based on the information of the gift card; and
obtaining the balance from the computer system of the issuer of the gift card.

13. The computer readable medium of claim 12, wherein the transaction is input into the PFMA by the user.

14. The computer readable medium of claim 12, wherein identifying the gift card as the payment source comprises receiving, within the PFMA, an input from the user designating the gift card as the payment source.

15. The computer readable medium of claim 12, wherein the transaction is input into the PFMA based on an electronic receipt.

16. The computer readable medium of claim 15,
wherein the electronic receipt comprises a reference to the gift card, and
wherein identifying the gift card as the payment source is based on the electronic receipt.

17. The computer readable medium of claim 12,
wherein the savings plan further comprises at least one spending category, wherein the at least one spending category, among a plurality of spending categories, is used for tracking spending data of the user,
wherein the user elects to reduce spending in the at least one spending category to facilitate the future purchase for a target item.

18. The computer readable medium of claim 17, wherein the offer comprises a sales promotion associated with the target item.

19. The computer readable medium of claim 17, the instructions when executed by the computer further comprises functionality for:
receiving, from the computer system of the merchant, low cost alternatives associated with one or more spending categories of the plurality of spending categories; and
presenting the low cost alternatives to the user.

20. The computer readable medium of claim 11, the instructions when executed by the computer further comprises functionality for:
trading the gift card with another user; and
transmitting, using the CPU, information of the gift card to the another user,
wherein the information of the gift card comprises information of an issuer of the gift card, the balance of the gift card, and a gift card code of the gift card.

21. A system for managing the use of a gift card, comprising:
a personal financial management application (PFMA) executing on a central processing unit (CPU) and configured to:
track spending data of a user and maintain a balance of the gift card; and
obtain a savings plan comprising a target savings amount designated for a future purchase for a target item; and
a gift card management module operatively coupled to the PFMA, configured to:
obtain information of the gift card from the user;
access a computer system of an issuer of the gift card based on the information of the gift card;
obtain the balance of the gift card from the computer system of the issuer of the gift card;
provide the balance to the PFMA;
generate an adjusted target savings amount by:
obtaining information of a merchant accepting the gift card;
sending, based on the information of the merchant, an inquiry to a computer system of the merchant regarding the target item;
receiving, in response to the inquiry, an offer from the computer system of the merchant regarding the target item, wherein the offer comprises a price discount;
receiving an election from the user to apply a portion of the balance toward the future purchase; and
reducing the target savings amount by the price discount and the portion of the balance; and
generate a notification to the user indicating an estimated time to save the adjusted target savings amount.

22. The system of claim 21, further comprising
a data repository, operatively connected to the server, configured to store spending data and the information of the gift card.

23. The system of claim 21, wherein the gift card management module is further configured to:
obtain, within the PFMA, a transaction of the user;
identify the gift card as a payment source of the transaction; and
adjust the balance based on the transaction in response to identifying the gift card as the payment source.

24. The system of claim 23, wherein the transaction is input into the PFMA by the user.

25. The system of claim 23, wherein identifying the gift card as the payment source comprises receiving, within the PFMA, an input from the user designating the gift card as the payment source.

26. The system of claim 23, wherein the transaction is input into the PFMA based on an electronic receipt.

27. The system of claim 26,
wherein the electronic receipt comprises a reference to the gift card, and
wherein identifying the gift card as the payment source is based on the electronic receipt.

28. The system of claim 21,
wherein the savings plan further comprises at least one spending category, wherein the at least one spending category, among a plurality of spending categories, is used for tracking spending data of the user, wherein the user elects to reduce spending in the at least one spending category to facilitate the future purchase for a target item.

29. The system of claim 21, wherein the gift card management module is further configured to:
receive, from the computer system of the merchant, low cost alternatives associated with one or more spending categories of the plurality of spending categories; and
present the low cost alternatives to the user.

30. The system of claim 21, wherein the gift card management module is further configured to:
trade the gift card with another user; and
transmit information of the gift card to the another user, wherein the information of the gift card comprises information of an issuer of the gift card, the balance of the gift card, and a gift card code of the gift card.

\* \* \* \* \*